(12) United States Patent
Kakui et al.

(10) Patent No.: US 8,081,376 B2
(45) Date of Patent: Dec. 20, 2011

(54) MULTI-STAGE FIBER AMPLIFIER TO SUPPRESS RAMAN SCATTERED LIGHT

(75) Inventors: Motoki Kakui, Yokohama (JP); Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 332 days.

(21) Appl. No.: 12/153,900

(22) Filed: May 27, 2008

(65) Prior Publication Data
US 2008/0304137 A1 Dec. 11, 2008

(30) Foreign Application Priority Data
Jun. 6, 2007 (JP) ................ P2007-150821

(51) Int. Cl.
*H04B 10/17* (2006.01)
*H04B 10/12* (2006.01)

(52) U.S. Cl. ............ 359/341.33; 359/337; 359/337.2; 359/341.3

(58) Field of Classification Search ............ 359/341.3, 359/337, 337.2, 341.33
See application file for complete search history.

(56) References Cited

U.S. PATENT DOCUMENTS

| | | | |
|---|---|---|---|
| 5,119,229 A * | 6/1992 | Grasso et al. | 359/341.1 |
| 5,864,644 A | 1/1999 | DiGiovanni et al. | |
| 5,892,615 A * | 4/1999 | Grubb et al. | 359/341.31 |
| 6,118,575 A * | 9/2000 | Grubb et al. | 359/337 |
| 6,151,338 A * | 11/2000 | Grubb et al. | 372/6 |
| 6,236,498 B1 * | 5/2001 | Freeman et al. | 359/337.1 |
| 6,324,322 B1 * | 11/2001 | Luo et al. | 385/43 |
| 6,400,861 B1 * | 6/2002 | Forbes et al. | 385/24 |
| 2003/0021302 A1 * | 1/2003 | Grudinin et al. | 372/6 |

OTHER PUBLICATIONS

J. Limpert et al., "Sub-10 ns Q-switched Yb-doped photonic crystal fiber laser," JWB51, CLEO, 2005, pp. 1-3.

* cited by examiner

*Primary Examiner* — Eric Bolda
(74) *Attorney, Agent, or Firm* — Venable LLP; Michael A. Sartori; Christopher Ma

(57) ABSTRACT

The invention relates to a light source apparatus having a structure for effectively suppressing a negative effect due to a nonlinear effect generated in propagation of an amplifying light, and realizing a stable operation. In the light source apparatus, light amplified in an optical amplifier fiber is emitted to the outside of the apparatus through an optical output fiber whose one end is connected to an output connecter. At this time, a part of Raman scattered light, generated in the optical output fiber, propagates toward an pumping light source through the optical amplifier fiber from the optical output fiber. An optical component having an insertion loss spectrum that attenuates the Raman scattered light but allows pumping light or light to be amplified to transmit therethrough, is provided on a propagation path of the Raman scattered light, due to the light component, the intensity of the Roman scattered light reaching the pumping light source is effectively reduced. As a result, a negative effect due to a nonlinear effect generated in propagation of light to be amplified can be effectively suppressed, and the light source apparatus can be stably operated.

5 Claims, 15 Drawing Sheets

*Fig.8*

|  | PER ONE-ROUND PASSAGE | NUMBER OF PASSAGES | SUM |
|---|---|---|---|
| YbDF52 GAIN (dB) | 10 | 2 | 20 |
| YbDF53 GAIN (dB) | 13 | 2 | 26 |
| ISOLATION (dB) | -22 | 1 | -22 |
| WDM COUPLER (dB) | -2 | 2 | -4 |
| PUMPING LD42 REFLECTION (dB) | -15 | 1 | -15 |
| DELIVERY FIBER REFLECTION (dB) | 9.624 | 1 | 9.624 |
|  |  | TOTAL | 14.624 |

MULTI-STAGE FIBER AMPLIFIER TO SUPPRESS RAMAN SCATTERED LIGHT

BACKGROUND OF THE INVENTION

1. Field of the Invention

The present invention relates to a light source apparatus outputting light that has been amplified in an optical amplifier waveguide.

2. Related Background Art

Light source apparatuses, which amplify light by use of optical amplifier waveguides, have been applied in the respective fields of laser machining, communications, measurements, and the like. In these fields, it is useful to realize an optical pulse with a narrow pulse width and high peak power. Fiber lasers or fiber amplifiers are compact optical devices capable of performing high-efficiency optical amplification, and have a beam quality substantially diffraction-limited, having received a great deal of attention.

In an optical device in which optical fibers are applied as amplifying transmission paths as described above, when the peak power of output light is increased, a nonlinear effect (stimulated Raman scattering (SRS), stimulated Brillouin scattering (SBS), or the like) occurs in the optical fiber. Such a nonlinear effect brings a negative effect such as deterioration of a pulse waveform of an output light. In particular, in the practical use of a high-power outputted optical pulse, not only an optical amplifier waveguide, but also an optical output waveguide (so-called delivery fiber) to guide a light from the optical amplifier waveguide to an output end is preferably lengthened as much as possible. Accordingly, there is further concern that a nonlinear effect occurs. There is recorded in J. Limpert et al., "Sub-10 ns Q-switched Yb-doped photonic crystal fiber laser," CLEO2005, JWB51 (Document 1) a case in which an attempt is made to suppress a nonlinear effect by using a particular optical amplifier fiber with a core diameter of 35 μm in order to avoid such a nonlinear effect.

SUMMARY OF THE INVENTION

The present inventors have examined the above prior art, and as a result, have discovered the following problems. That is, when an optical fiber with a large core diameter is used as described in Document 1, it is difficult to keep the transverse mode in the fundamental state in the optical fiber. For example, there is concern that, the beam quality is deteriorated by merely touching the optical fiber, which makes it difficult to stably operate the apparatus. Moreover, in Document 1, an optical output waveguide (a delivery fiber) disposed behind an optical amplifier waveguide (optical amplifier fiber) is not taken into consideration.

When a spectrum width of an output light is broadened or a pulse width thereof is shortened, stimulated Brillouin scattering may be avoided. However, Raman scattered light does not depend on a spectrum width and a pulse width of output light, which leads to great impediments in many cases. Therefore, measures against Raman scattered light are thought to be particularly important.

The present invention has been developed to eliminate the problems described above. It is an object of the present invention to provide a light source apparatus having a structure for effectively suppressing a negative effect due to a nonlinear effect generated in propagation of light to be amplified, and making a stable operation possible.

The light source apparatus according to the present invention is an optical device that outputs a light amplified in an optical amplifier waveguide, and comprises the optical amplifier waveguide, a pumping light source, an optical multiplexer, an optical output waveguide, and an optical component.

The optical amplifier waveguide amplifies light to be amplified by transmitting pumping light and light to be amplified which have a same transverse mode therethrough. The pumping light source outputs a single-transverse-mode pumping light. The optical multiplexer multiplexes the pumping light outputted from the pumping light source and the light to be amplified, and introduces the multiplexed light toward the optical amplifier waveguide. The optical output waveguide is a transmission medium optically connected to an output end of the optical amplifier waveguide, and constitutes a part of a propagation path of light to be amplified that is emitted from the optical amplifier waveguide. The optical component has an insertion loss spectrum that attenuates a Raman scattered light generated in the optical output waveguide but allows pumping light or light to be amplified to transmit therethrough, and the optical component is provided on a light path between the pumping light source and the optical output waveguide.

Note that the term "same transverse mode" means a case in which both of pumping light and the light to be amplified are in an LP01 mode or both of pumping light and light to be amplified are in an LP11 mode, or the like.

In the light source apparatus according to the present invention, the optical multiplexer is preferably a fused fiber optical coupler. On the other hand, the optical component is preferably a fused fiber optical coupler provided on a path of light to be amplified. Further, ions making an optical amplifier effect in the optical amplifier waveguide are preferably Yb ions.

It is preferable that the optical component has a loss $X$ (dB), in a Raman scattered light wavelength, which satisfies the following conditions: "$X > G - L + R_1 + R_2$" and "$R_2 = K_1 \cdot Q - K_2$", when a gain to Raman scattered light during one-round passage between the pumping light source and the optical output waveguide is set to $G$ (dB), a loss in Raman scattered light during one-round passage between the pumping light source and the optical output waveguide is set to $L$ (dB), a reflectance ratio of Raman scattered light of the pumping light source is set to $R_1$ (dB), an apparent reflectance ratio of Raman scattered light viewed at an input end of the optical output waveguide is set to $R_2$ (dB), a product of power (kW) of light to be amplified that is inputted into the optical output waveguide and a length (m) of the optical output waveguide is Q, and coefficients obtained at the time of executing collinear approximation of a relationship of the apparent reflectance ratio for a product of laser light power and the length of the optical output waveguide are $K_1$ and $K_2$, Further, the optical component is preferably selected depending on an optical output waveguide. Where the reflectance ratio $R_1$ is defined as an expression "$R_1 = Y - X$" by using incident light power incident to the optical component (including a fiber): $X$ (dBm) and reflected light power propagating in a direction opposite to the incident light: $Y$ (dBm). When the optical component is a passive component, $R_1$ becomes a negative number.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred

BRIEF DESCRIPTION OF THE DRAWINGS

FIG. 8 is a table summarizing gain, isolation, and the like of the respective components constituting the light source apparatus shown in FIG. 3;

DESCRIPTION OF THE PREFERRED EMBODIMENTS

Figure 1:
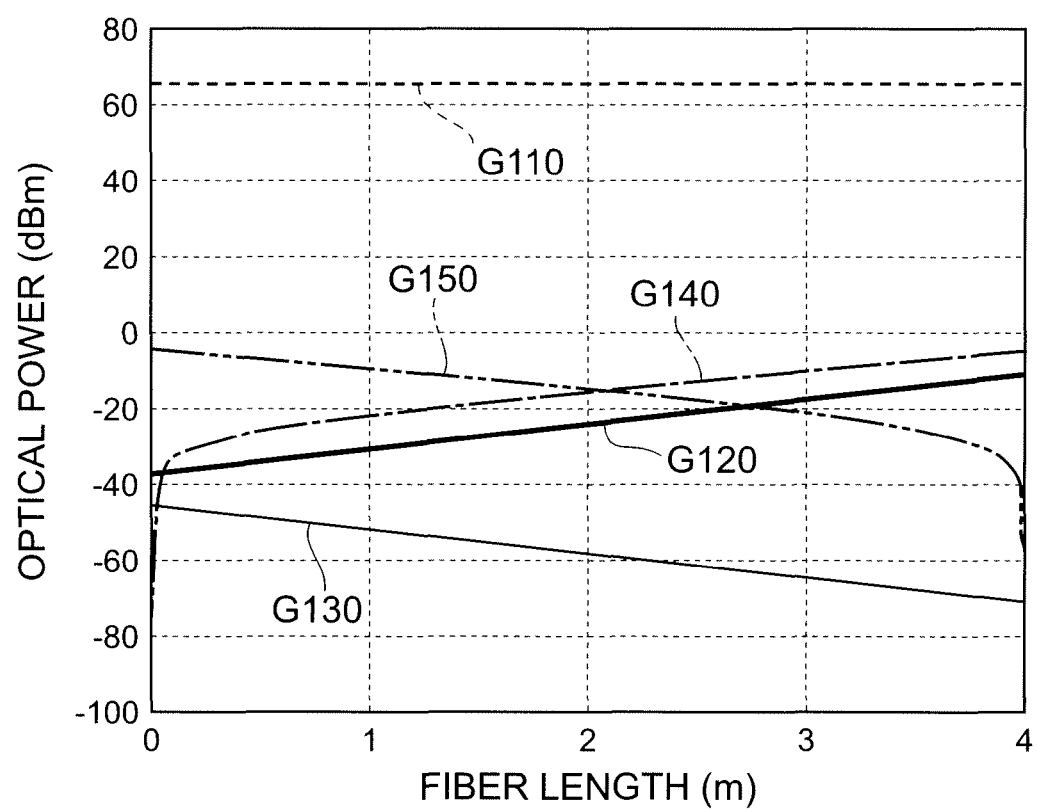
FIG. 1 shows an optical power distribution in an optical output fiber with a length of 4 meters.

In the following, embodiments of a light source apparatus according to the present invention will be explained in detail with reference to FIGS. 1 to 9, 10A to 10C, and 11 to 15. In the description of the drawings, identical or corresponding components are designated by the same reference numerals, and overlapping description is omitted.

In the light source apparatus according to the present invention, an optical output fiber (delivery fiber) serving as an optical output waveguide is provided after an optical amplifier fiber serving as an optical amplifier waveguide. Power distributions of various light components in a longitudinal direction of the optical output fiber will be described by using FIG. 1. FIG. 1 shows optical power distributions in the optical output fiber with a length of 4 meters.

In FIG. 1, the graph G110 shows a power distribution of light to be amplified, the graph G120 shows a power distribution of signal light, the graph G130 shows a power distribution of Rayleigh backscattered light, the graph G140 shows a power distribution forward direction Raman scattered light, and the graph G150 shows a power distribution of backward direction Raman scattered light, and the respective power distributions shown in FIG. 1 are simulation results of level diagrams of the optical output fiber. The light to be amplified is light which is amplified in the optical amplifier fiber, and is guided into the optical output fiber. The signal light is light of −37 dBm with a wavelength which is the same as a wavelength of Raman scattered light, and is light inputted into the optical output fiber in an expedient manner. An optical connector provided to an output end of the optical output fiber has an end cap structure having undergone APC polishing, and it is assumed that the reflectance ratio is set to −60 dB.

When the power of the light to be amplified that is inputted into the optical output fiber is 1 mW under the above-described condition, a reflectance ratio of the signal light viewed at an input end of the optical output fiber is −56.6 dB, which is substantially the same as a reflectance ratio of the output connector. However, when the power of the light to be amplified that is guided into the optical output fiber is 4 kW, a reflectance ratio of the signal light viewed at the input end of the optical output fiber is −7 dB, which is an extremely high reflectance ratio apparently.

Note that it is assumed that the power of pumping light is constant along a longitudinal direction of the optical fiber in this simulation. However, the simulation results can be applied to not only a case in which the pumping light is a continuous wave, but also, for example, a case in which the pumping light is pulsed light with a pulse width longer than a time of 20 ns for propagating through the fiber length of 4 meters.

Figure 2:
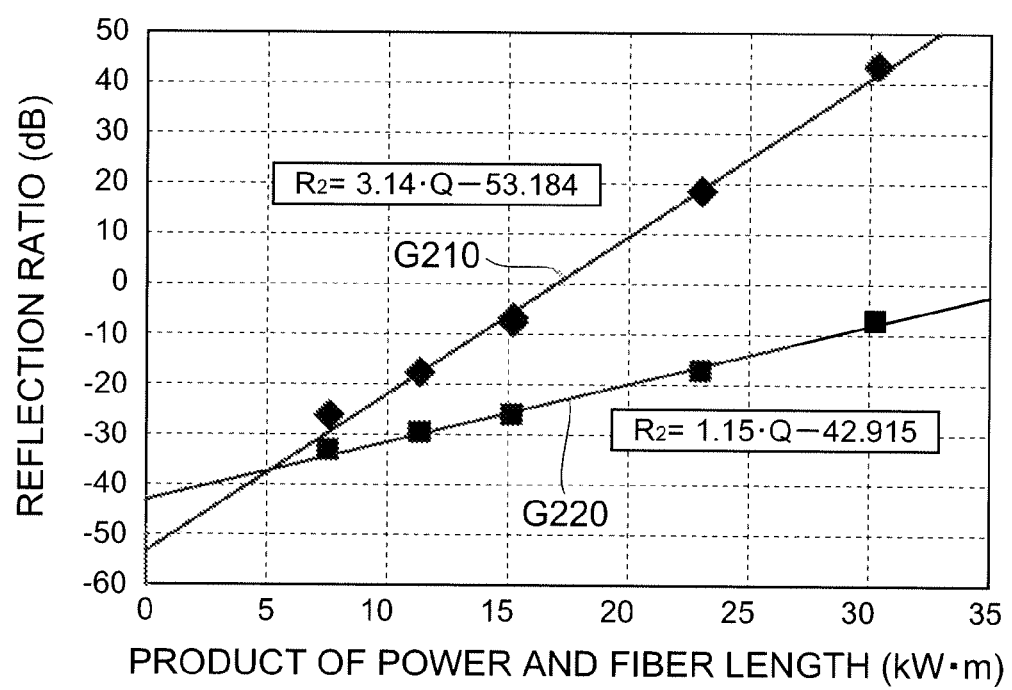
FIG. 2 is a graph showing a relationship between an apparent reflectance ratio of a signal light at an input end of the optical output fiber and a product of power of light to be amplified (kW) and a length of the optical output fiber (m)

An apparent signal light reflectance ratio $R_2$ at the input end of the optical output fiber is provided as a direct function of the product Q of the power of the light to be amplified (kW) and the length of the optical output fiber (m) as shown in FIG. 2. In FIG. 2, the straight line G210 indicates a direct function obtained assuming that the optical output fiber has a waveguide structure with a mode field diameter (MFD) of 10 μm in a 1.06-μm band which is a wavelength of YAG laser light. This straight line G210 is represented as an expression "$R_2 = 3.14 \cdot Q - 53.184$."

On the other hand, in a case of a silica-based fiber excellent in high-powered light propagation, it is difficult to keep a single-mode operation with an MFD greater than the above-described MFD. However, currently, in order to suppress a nonlinear effect, an LMA (Large-Mode-Area) fiber which is a multi-mode fiber in a precise sense, and is also used under the condition that pumping is not performed in a higher-order mode is used as a last resort in many cases.

In this regard, an optical fiber with a core diameter of 35 μm as described in the Document 1 is unrealistic, and an optical fiber with a core diameter of approximately 20 μm and a NA of approximately 0.08 at a maximum is an upper limit to obtain a practical diffraction limit. The straight line G220 in FIG. 2 indicates a direct function obtained in a case in which an LMA fiber is used as an optical output fiber. This straight line G220 is represented as an expression "$R_2 = 1.15 \cdot Q - 42.915$." It is clear that the apparent reflectance ratio due to the Raman scattered light greatly increases due to the MFD of the LMA fiber being about 1.5 times the MFD of 10 μm.

Figure 3:
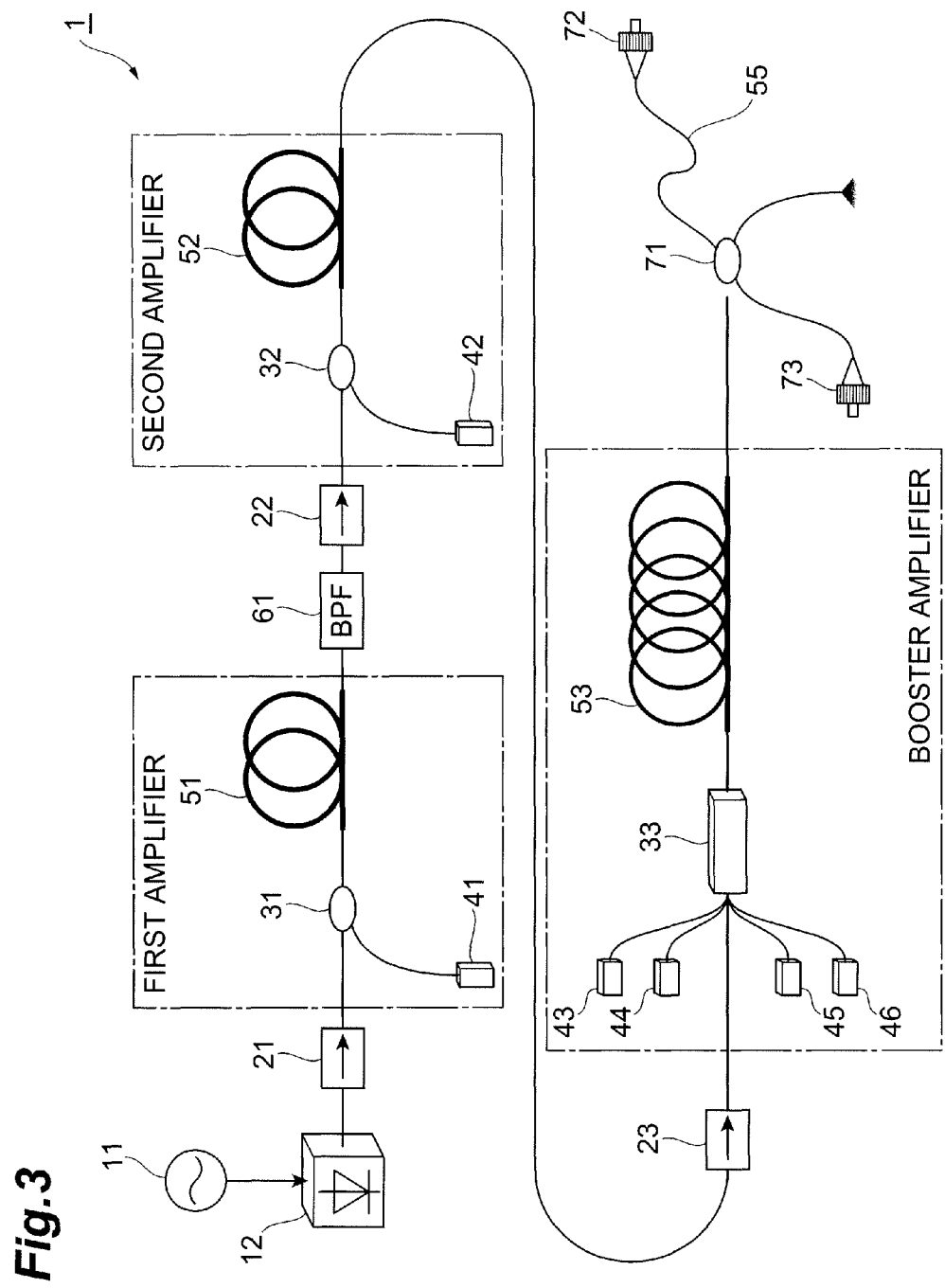
FIG. 3 is a diagram showing a first configuration example of a conventional light source apparatus.

Here, a light source apparatus 1 having a structure as shown in FIG. 3 is considered. The light source apparatus 1 is a fiber type light source having an MOPA (Master Oscillator Power Amplifier) structure. The light source apparatus 1 comprises a seed light source 12 driven by an electric signal source 11, and a first preamplifier, a second preamplifier, and a booster preamplifier which are disposed in the order along a propagation direction of light between the seed light source 12 and an optical output fiber whose one end is connected to an output connector 72, and the light amplified in the respective amplifiers are emitted to the outside of the light source apparatus 1 through an optical amplifier fiber 55.

Note that the first preamplifier comprises a pumping light source 41, an optical multiplexer 31, and an optical amplifier fiber 51. The second preamplifier comprises a pumping light source 42, an optical multiplexer 32, and an optical amplifier fiber 52. The booster amplifier comprises a plurality of pumping light sources 43 to 46, an optical combiner 33, and an optical amplifier fiber 53. An optical isolator 1 is disposed between the seed light source 12 and the first preamplifier, a band-pass filter 61 and an optical isolator 22 are disposed between the first preamplifier and the second preamplifier, and an optical isolator 23 is disposed between the second preamplifier and the booster amplifier. The other end of the optical output fiber 55 is optically connected to an output end of the booster amplifier (an output end of the optical amplifier fiber 53) through an optical coupler 71, and a part of reflected light from the optical output fiber 55 is guided to a reflection monitor connector 73 by the optical coupler 71.

In the light source apparatus 1, pumping light outputted from the pumping light source 41 is supplied to the optical amplifier fiber 51 through the light multiplexer 31, and pumping light outputted from the pumping light source 42 is supplied to the optical amplifier fiber 52 through the light multiplexer 32. Further, pumping light components outputted from the pumping light sources 43 to 46 are supplied to the optical amplifier fiber 53 through the optical combiner 33.

Seed light (light to be amplified) outputted from the seed light source 12 driven by the electric signal source 11 is guided to the optical amplifier fiber 51 through the optical isolator 21 and the light multiplexer 31, and the light is amplified in the optical amplifier fiber 51. The light to be amplified, which has been amplified in the optical amplifier fiber 51, is guided to the optical amplifier fiber 52 through the band-pass filter 61, the optical isolator 22, and the light multiplexer 32, and on the other hand, the pumping light outputted from the pumping light source 42 is supplied through the light multiplexer 32. Therefore, the light to be amplified is further amplified in the optical amplifier fiber 52.

The light to be amplified, which has been amplified in the optical amplifier fiber 52, is guided to the optical amplifier fiber 53 through the optical isolator 23 and the optical combiner 33, and on the other hand, the pumping light components outputted from the pumping light sources 43 to 46 are supplied through the optical combiner 33. Therefore, the light to be amplified is further amplified in the optical amplifier fiber 53. Then, the light to be amplified, which has been amplified in the optical amplifier fiber 53, propagates through the optical output fiber (delivery fiber) 55 connected to the optical amplifier fiber 53 via the optical coupler 71 of 17 dB, and the light to be amplified is emitted to the outside of the light source apparatus 1 from the output connector 72 provided to the output end of the optical output fiber 55. A reflection component of the light to be amplified is emitted to the outside of the light source apparatus 1 through the reflection monitor connector 73 from the optical coupler 71 so as to be monitored.

Semiconductor laser light sources are respectively used as the seed light source 12 and the pumping light sources 41 to 46. As the optical amplifier fibers 51 to 53, silica-based optical fibers (YbDF: Yb-doped fibers) in which Yb elements are doped to optical waveguide regions are used. Yb elements have a pumping wavelength and a wavelength of light to be amplified which are approximate to one another, and have only two energy levels which are a ground level and a pumping level. Therefore, YbDFs are suitable for use in outputting high-powered light. The optical amplifier fibers 51 and 52 are components constituting the parts of the preamplifiers, and the optical amplifier fiber 53 is a component constituting the booster amplifier. The optical output fiber 55 has a length of 3 meters or more, for example.

Since the light to be amplified that is outputted from the second preamplifier is required to have significant power, from the standpoint of a power conversion efficiency, the pumping light sources 41 and 42 that output pumping light components supplied respectively to the optical amplifier fibers 51 and 52 are preferably single-transverse-mode pumping laser diodes for 0.98-µm wavelength band, which have been widely-distributed for communications use. The optical multiplexers 31 and 32 are required to be WDM couplers in order to couple the pumping light components of 0.98-µm wavelength band which are outputted from these pumping light sources 41 and 42 and the light to be amplified with 1060 nm-wavelength band which is outputted from the seed light source 12.

Figure 4:
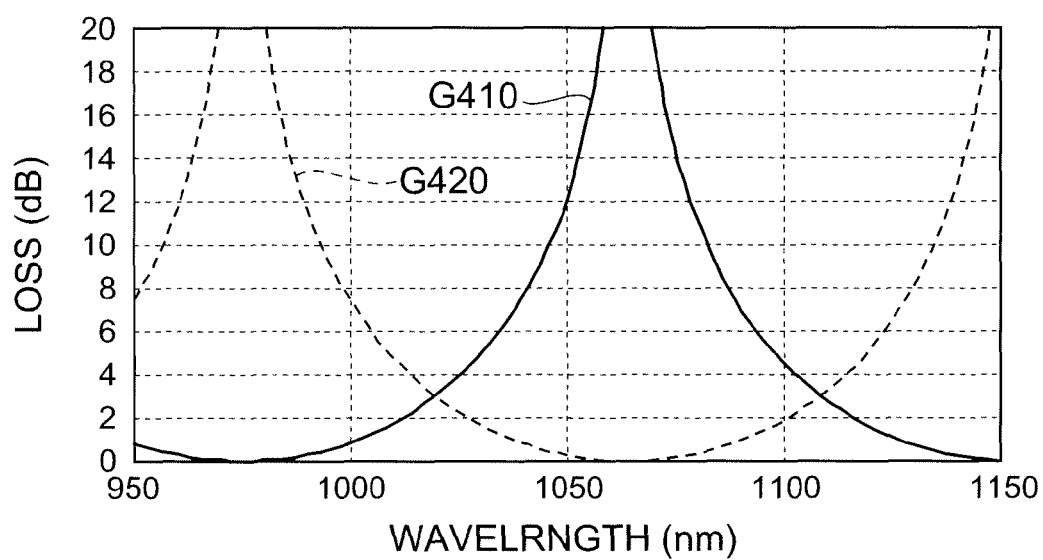
FIG. 4 shows an insertion loss spectrum of a WDM coupler for 975-/1060-nm band multiplexing.

Further, the optical multiplexers 31 and 32 are required to have low insertion loss and high resistance to optical damage, and to be at low cost. Therefore, the respective optical multiplexers 31 and 32 are preferably fused fiber optical couplers. However, fused fiber optical couplers for multiplexing in 975-/1060-nm bands representatively have periodic insertion loss spectrums as shown in FIG. 4. In particular, when light with near 1110 nm which is Raman scattering components propagates backward from the optical output fiber 55 serving as a delivery fiber, because the optical multiplexer 32 serving as a fused fiber optical coupler has a slight insertion loss of 2 dB in its wavelength, the Raman scattering components are propagated up to the pumping light source 42.

Note that, when another type of WDM coupler (for example, a dielectric multilayer filter) is used as the optical multiplexer 32, provided that the WDM coupler is designed so as to increase the insertion loss at a wavelength of 1110 nm, it is possible to prevent Raman scattering components from being mixed in the pumping light source 42. However, due to the light to be amplified, a backward direction ASE from the optical amplifier fiber 52, and stimulated Brillouin scattering generated in the optical amplifier fiber 52, an optical damage risk occurs.

Figure 5:
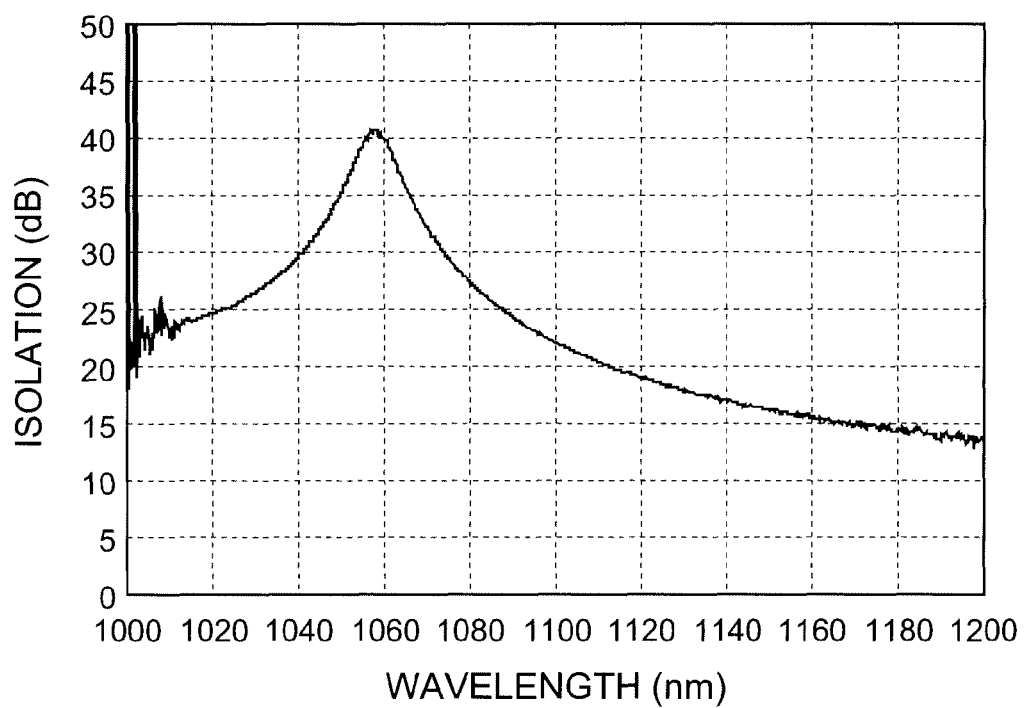
FIG. 5 shows an isolation spectrum of an optical isolator.

In addition, the optical isolator 23 disposed between the optical output fiber 55 and the pumping light source 42 is an optical component to originally prevent back-flow of light. However, the isolation has wavelength dependence as shown in FIG. 5, and has only isolation of approximately 20 dB at a wavelength of 1110 nm.

Figure 6:
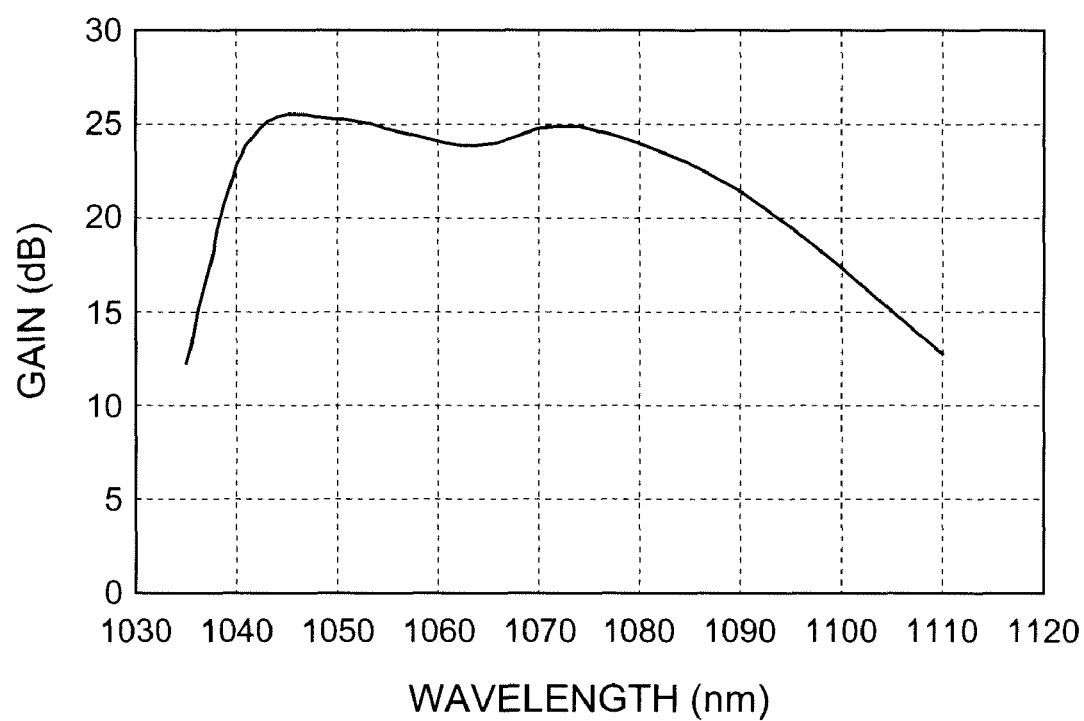
FIG. 6 shows a gain spectrum of YbDF.

On the other hand, in an YbDF, as shown in FIG. 6, the base of the gain spectrum spreads up to a wavelength of 1110 nm, and the YbDF has gain of approximately 50% in dB at a wavelength of 1110 nm of that at a wavelength of 1060 nm of the light to be amplified that should be originally amplified. A pulse peak value of the seed light (light to be amplified) outputted from the seed light source 12 is at a level of a several tens of mW, and with respect to a light source apparatus that amplifies the light to be amplified to approximately 10 kW which is required for laser machining, gains in the optical amplifier fibers 52 and 53 which are YbDFs are required to be approximately 50 dB. In particular, gains of approximately 25 dB are provided even by a light at a wavelength of 1110 nm.

The optical amplifier fiber 53 included in the booster amplifier is clad-pumping as a general rule. Then, by using the optical combiner 33 as described in, for example, U.S. Pat. No. 5,864,644 (Document 2), light having multiple-transverse-modes outputted from the pumping light sources 43 to 36 are combined into the optical amplifier fiber 53 having a double cladding structure. The optical combiner 33 does not basically have wavelength dependence, and therefore, the optical combiner 33 allows Raman scattering components generated in the optical output fiber 55 to transmit therethrough without any loss.

Figure 7:
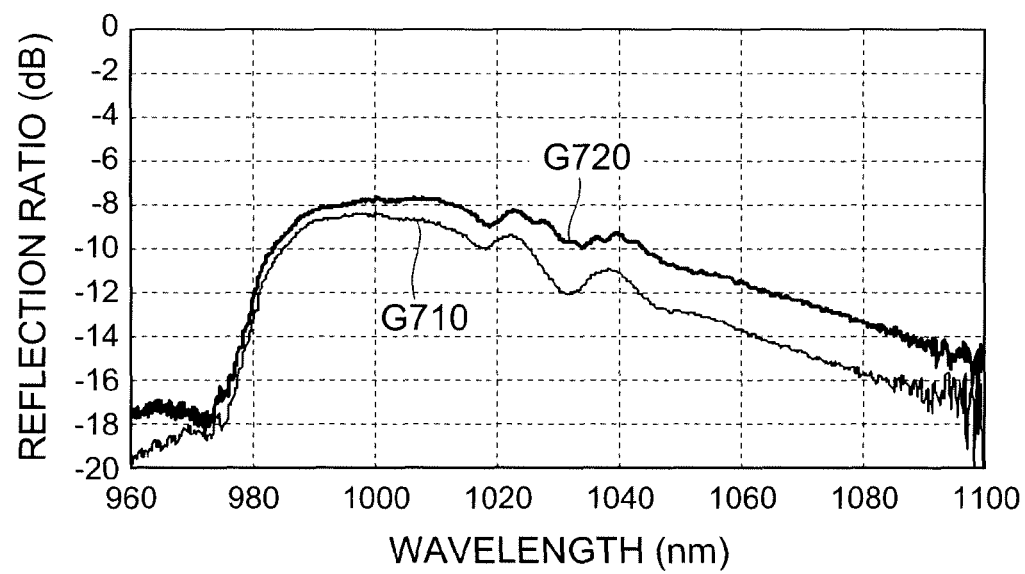
FIG. 7 shows a reflectance spectrum in a single transverse mode pumping laser diode for 0.98-μm wavelength band.

Further, in general, the single-transverse-mode pumping laser diodes for 0.98-μm wavelength band which are used as the pumping light sources 41 and 42 have certain levels of reflectance ratios as shown in FIG. 7. This is because the performance of AR coating on the front faces of the laser diode chips is limited. A table in which the above descriptions are organized is shown in FIG. 8. In FIG. 8, a case is assumed in which optical output pulses with 1060-nm wavelength band in the optical output fiber 55 have a pulse width of 20 ns at the peak power of 10 kW, and a length of the optical output fiber 55 is 2 m.

Figure 9:
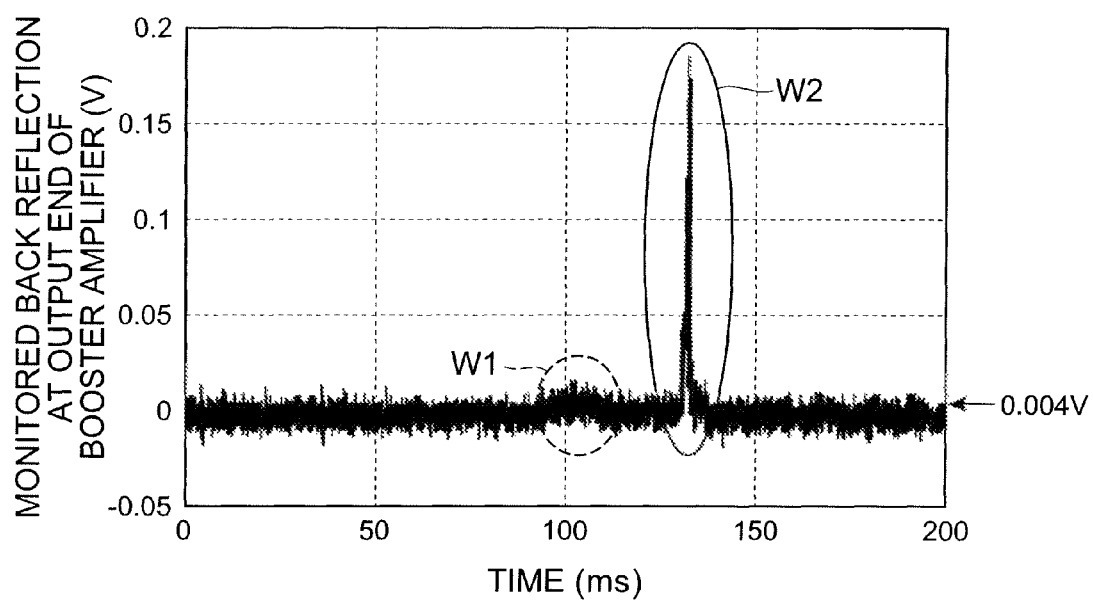
FIG. 9 shows an optical pulse waveform of a backward direction propagating component at an input end of the optical output fiber (an output end of a booster amplifier)

Under the above-described condition, a gain of 14 dB is produced during one-round passage on the path from the input end of the optical output fiber 55 (the output end of the booster amplifier) up to the pumping light source 42, which generates laser oscillations at a wavelength of 1110 nm. As a result, for example, as seen in the backward direction propagating components at the input end of the optical output fiber 55, as shown in FIG. 9, it can be understood that a pulse W2 having peak power of approximately 370 mW which is remarkably higher than that of a pulse W1 is generated. The optical pulse W2 reaches peak power of approximately 4.6 W immediately anterior to the pumping light source 42, and has power sufficient to damage the coating on the front face of the laser diode chip of the pumping light source 42. Or, there is concern about damaging the coating of the optical isolator 23. Further, a Raman scattering component pulse has a feature that its pulse width is much narrower than the pulse width 20 ns of the original amplifying light.

Figure 10A:
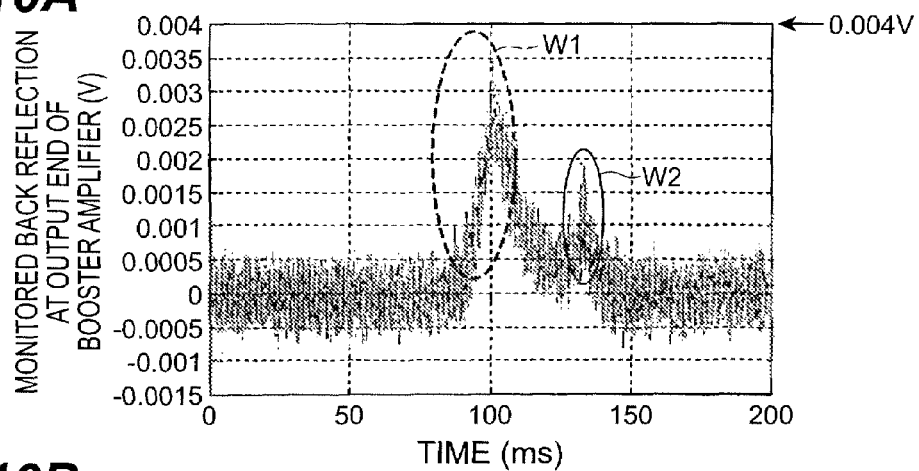
FIGS. 10A to 10C respectively show optical pulse waveforms of a backward direction propagating component at the input end of the optical output fiber (the output end of a booster amplifier) when changing an output power of the booster amplifier (60%, 80%, 100%)
Figure 10B:
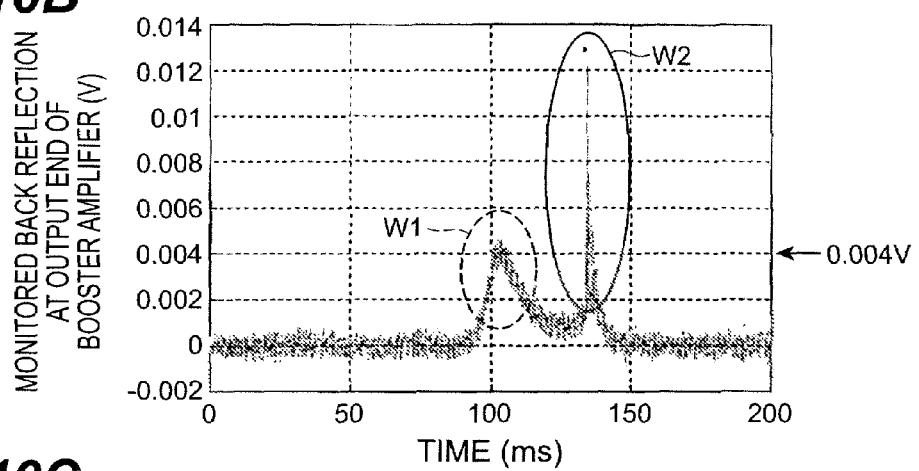
Figure 10C:
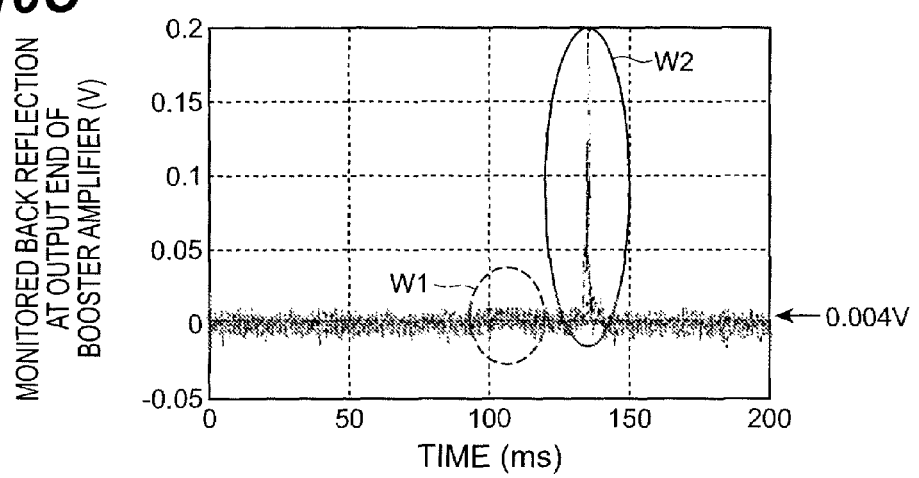
Figure 11:
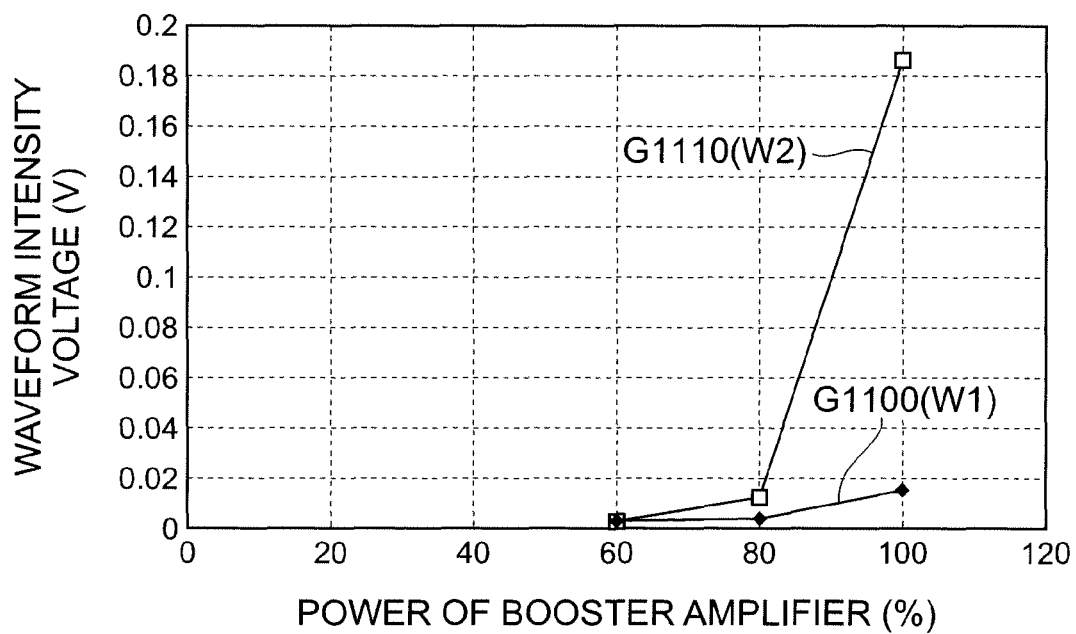
FIG. 11 is a graph showing changes of respective waveform strengths of backward direction propagating components W1 and W2 when changing an output power of the booster amplifier (60%, 80%, 100%)

FIGS. 10A to 10C are graphs for explaining the situations that the pulse W2 grows as an output power in the booster amplifier is increased. In particular, FIG. 10A shows intensity voltages of the pulse W1 and the pulse W2 when the output power in the booster amplifier is 60%. FIG. 10B shows intensity voltages of the pulse W1 and the pulse W2 when the output power in the booster amplifier is 80%. FIG. 10C shows intensity voltages of the pulse W1 and the pulse W2 when the output power in the booster amplifier is 100%, which is a graph corresponding to FIG. 9. Further, FIG. 11 shows respective waveform intensity changes of backward direction propagating components W1 and W2 when the output power in the booster amplifier is varied (60%, 80%, and 100%), and the graph G1100 shows intensity voltages of the pulse W1 and the graph G1110 shows intensity voltages of the pulse W2. As is clear from these graphs, because the pulse W2 grows much higher than the pulse W1 as the output power in the booster amplifier is increased, the pulse W2 could be an optical component that brings damage to the pumping light source 42, the optical isolator 23, and the like.

Figure 12:
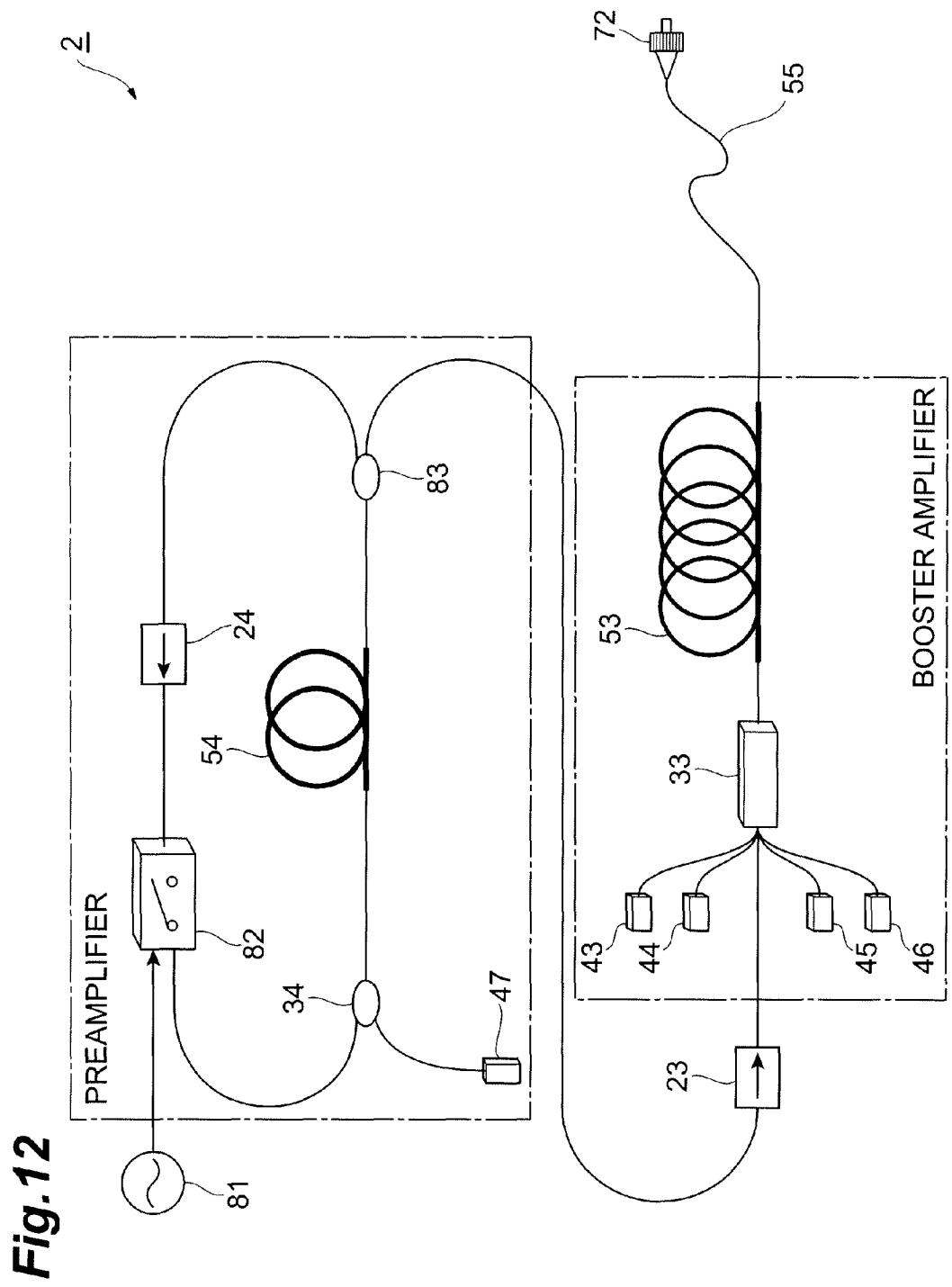
FIG. 12 is a diagram showing a second configuration example of the conventional art.

The situations described above are not limited to the light source apparatus 1 having an MOPA structure shown in FIG. 3, and they are caused in the same way as in a light source apparatus 2 having a structure using a Q switch shown in FIG. 12. In the light source apparatus 2 shown in FIG. 12, a preamplifier and a booster amplifier are disposed between an electric signal source 81 and the optical output fiber 55 whose one end is connected to the output connector 72. The optical isolator 23 is disposed between the preamplifier and the booster amplifier. The preamplifier comprises a pumping light source 47, an optical multiplexer 34, an optical amplifier fiber 54, an optical switch 82, an optical isolator 24, and an optical coupler 83. On the other hand, the booster amplifier comprises a plurality of the pumping light sources 43 to 46, the optical combiner 33, and the optical amplifier fiber 53. The output end of the booster amplifier (the output end of the optical amplifier fiber 53) and the input end of the optical output fiber 55 are fusion-spliced.

In the light source apparatus 2, pumping light outputted from the pumping light source (for example, a semiconductor laser light source) 47 is supplied to the optical amplifier fiber (for example, a YbDF) 54 through the light multiplexer 34. In the optical amplifier fiber 54 pumped by the supply of the pumping light, an emitted light is generated. The light resonates in a ring-type resonator including the optical amplifier fiber 54, the optical branching coupler 83, the optical isolator 24, the optical switch 82, and the optical multiplexer 34 when the optical switch 82 driven by the electric signal source 81 is closed.

Then, a part of the oscillated light obtained by the resonance when the optical switch 82 is closed is branched by the optical branching coupler 83. A part of the branched oscillated light is inputted into the optical amplifier fiber 53 through the optical isolator 23 and the optical combiner 33, and the light is amplified in the optical amplifier fiber 53. Then, the light to be amplified that has been amplified in the optical amplifier fiber 53 propagates in the optical output fiber (delivery fiber) 55 fusion-sliced to the output end of the optical amplifier fiber 53, and the light is emitted to the outside of the light source apparatus 2 from the output connector 72 provided to the output end of the optical output fiber 55.

In the light source apparatus 2 having a structure using the Q switch shown in FIG. 12 as well, in the same way as in the light source apparatus 1 described above, the Raman scattered light generated in the optical output fiber 55 is amplified in the optical amplifier fiber 53, and the light passes through the optical combiner 33, the optical isolator 23, and the optical branching coupler 83, and is further amplified in the optical amplifier fiber 54. The obtained amplified light propagated in the backward direction may pass through the optical multiplexer 34 so as to be incident into the pumping light source 47. As a result, there is a risk of damaging the coating on the front face of the laser diode chip of the pumping light source 47 and the like.

Figure 13:
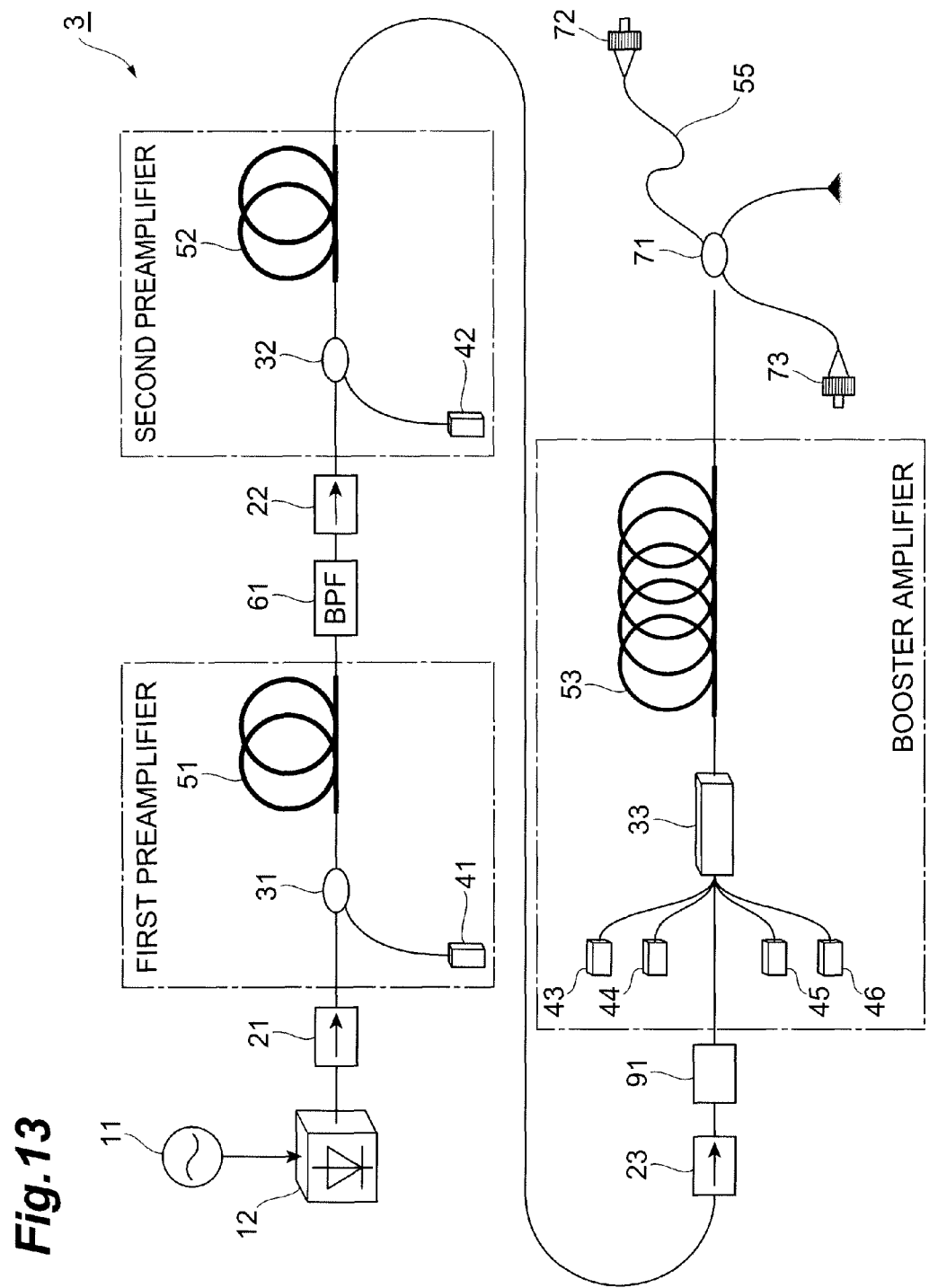
FIG. 13 is a diagram showing a structure of a first embodiment of a light source apparatus according to the present invention.
Figure 14:
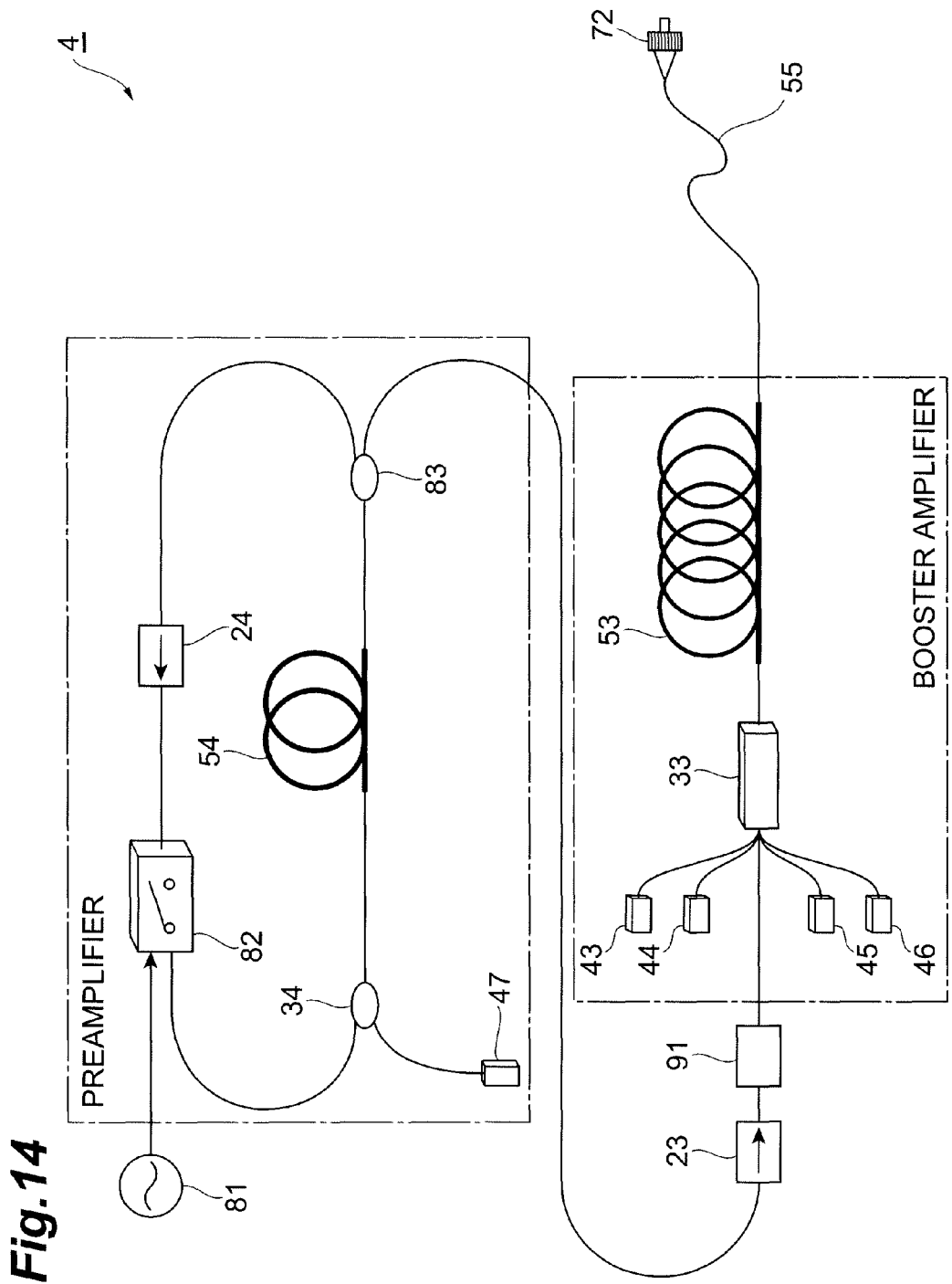
FIG. 14 is a diagram showing a structure of a second embodiment of a light source apparatus according to the present invention.

Then, the present invention has a structure as shown in FIGS. 13 and 14 in order to solve the above-described problems. Note that FIG. 13 is a diagram showing a structure of a first embodiment of the light source apparatus according to the present invention. Further, FIG. 14 is a diagram showing a structure of a second embodiment of the light source apparatus according to the present invention.

A light source apparatus 3 according to the first embodiment shown in FIG. 13 has a structure the same as that of the light source apparatus 1 shown in FIG. 3. However, the light source apparatus 3 is different from the light source apparatus 1 in the point that an optical component 91 is inserted between the optical isolator 23 and the optical combiner 33. Note that, in the first embodiment, the position where the optical component 91 is inserted is not limited to the place between the optical isolator 23 and the optical combiner 33, and may be a place between the optical isolator 23 and the optical amplifier fiber 52. Further, a light source apparatus 4 according to the second embodiment shown in FIG. 13 has a structure which is the same as that of the light source apparatus 2 shown in FIG.

12. Also, the light source apparatus 4 is different from the light source apparatus 2 in the point that the optical component 91 is inserted between the optical isolator 23 and the optical combiner 33. Note that, in the second embodiment, the position where the optical component 91 is inserted is not limited to the place between the optical isolator 23 and the optical combiner 33, and may be a place between the optical isolator 23 and the optical branching coupler 83.

Figure 15:
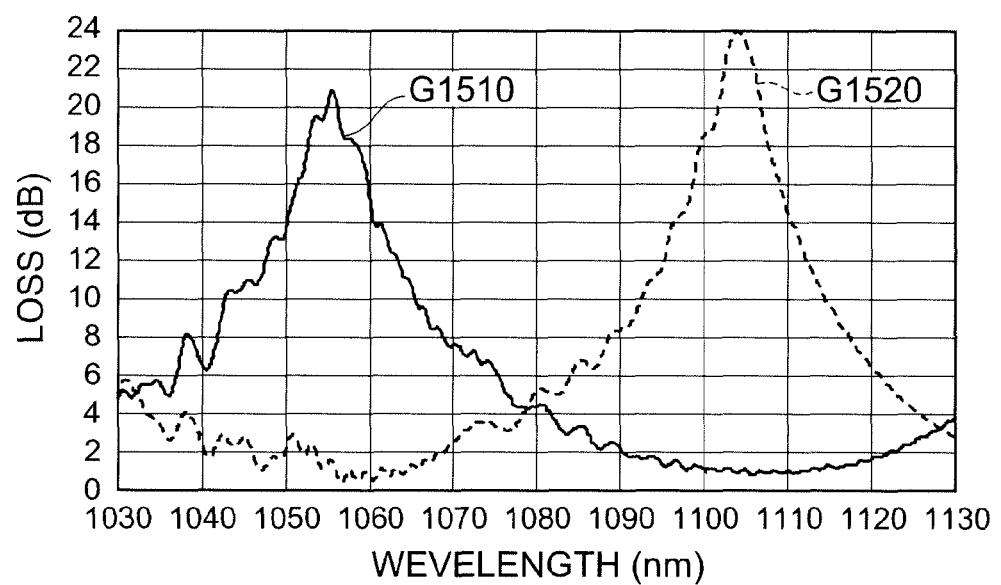
FIG. 15 shows insertion loss spectrums of optical components inserted between the optical isolator and the optical combiner in the light source apparatuses according to the first and second embodiments.

It is generally recommended that the optical component 91 be provided between the pumping light source 42 or 47 and the optical output fiber 55. However, the optical component 91 is preferably provided on the path of the light to be amplified, and is more preferably provided between the optical isolator 23 and the optical combiner 33. The optical component 91 has an insertion loss spectrum that attenuates a Raman scattered light generated in the optical output fiber 55, and also allows pumping light or light to be amplified to transmit therethrough. The optical component 91 is preferably a fused fiber optical coupler having an insertion loss spectrum as shown in FIG. 15.

In the light source apparatuses 3 and 4 according to the first and second embodiments, the amplifying light amplified through the optical isolator 23 is guided to the optical amplifier fiber 53 through the optical component 91 and the optical combiner 33, and the light is amplified through the optical amplifier fiber 53. Then, the light to be amplified that has been amplified in the optical amplifier fiber 53 propagates in the optical output fiber (delivery fiber) 55 optically connected to the optical amplifier fiber 53 through the optical coupler 71 of 17 dB, and the light is emitted to the outside of the light source apparatuses 3 and 4 from the output connector 72 provided to the output end of the optical output fiber 55.

On the other hand, the Raman scattered light generated in the optical output fiber 55 reaches the optical component 91 through the optical coupler 71, the optical amplifier fiber 53, and the optical combiner 33, and the light is attenuated in the optical component 91. Therefore, the intensity of the Raman scattered light reaching the pumping light sources 42 and 47 is extremely low, and a negative effect due to a nonlinear effect is effectively suppressed, which makes it possible to stably operate the light source apparatuses. In particular, due to the optical component 91 being inserted, a loss of 20 dB during one-round passage is produced in the Raman scattered light generated in the optical output fiber 55, which suppresses oscillation of the Raman scattered light.

Further, a gain to Raman scattered light during one-round passage between the pumping light source 42 or 47 and the optical output fiber 55 is set to G (dB). A loss in Raman scattered light during one-round passage between the pumping light source 42 or 47 and the optical output fiber 55 is set to L (dB). A reflectance ratio of Raman scattered light of the pumping light source 42 or 47 is set to $R_1$ (dB). An apparent reflectance ratio of Raman scattered light viewed at the input end of the optical output fiber is set to $R_2$ (dB). Further, a product of power (kW) of light to be amplified that is inputted into the optical output fiber 55 and a length (m) of the optical output fiber 55 is set to Q.

Under the above-described conditions, in a case in which the optical output fiber is an LMA fiber, it is preferable that a loss X (dB) in a Raman scattered light wavelength of the optical component 91 satisfies the conditions: "$X > G - L + R_1 + R_2$" and "$R_2 = 1.15 \cdot Q - 42.195$" is preferably used. Or, in a case in which the optical output fiber transmits light to be amplified in a single-mode, it is preferable that a loss X (dB) in a Raman scattered light wavelength of the optical component 11 satisfies the conditions "$X > G - L + R_1 + R_2$" and "$R_2 = 3.14 \cdot Q - 53.184$."

Note that, as another technique, a dielectric multilayer filter type optical multiplexer that blocks Raman scattering components may be used as the optical multiplexer 32. However, in this case, as described above, there is a risk that the optical multiplexer 32 is damaged by the amplifying light. It is preferable that a dielectric multilayer filter that blocks Raman scattering components and allows pumping light to transmit therethrough, is inserted in a place on the path between the pumping light source 42 and the optical multiplexer 32 through which an amplifying light does not pass.

As described above, in accordance with the present invention, in the light source apparatus that amplifies light in the optical amplifier waveguides and outputs the light, it is possible to suppress a negative effect due to a nonlinear effect, and to stably operate the apparatus.

From the invention thus described, it will be obvious that the embodiments of the invention may be varied in many ways. Such variations are not to be regarded as a departure from the scope of the invention, and all such modifications as would be obvious to one skilled in the art are intended for inclusion within the scope of the following claims.

What is claimed is:

1. A light source apparatus comprising:
   a front-stage optical amplifier waveguide amplifying light to be amplified by transmitting first pumping light and the light to be amplified, the first pumping light having the same transverse mode as the light to be amplified;
   a rear-stage optical amplifier waveguide amplifying the light to be amplified from said front-stage optical waveguide by transmitting a second pumping light and the light to be amplified, the second pumping light having a different transverse mode from the light to be amplified;
   a pumping light source outputting the first pumping light in a single transverse mode, the first pumping light being supplied to the front-stage optical amplifier waveguide;
   an optical multiplexer multiplexing the first pumping light outputted from said pumping light source and the light to be amplified, and introducing the multiplexed light into said front-stage optical amplifier waveguide;
   an optical output waveguide being a transmission medium optically connected to an output end of said rear-stage optical amplifier waveguide, said optical output waveguide constituting a part of a propagation path of the light to be amplified that has been emitted from said rear-stage optical amplifier waveguide; and
   an optical component provided on an optical path between said pumping light source and said rear-stage optical amplifier waveguide, said optical component having an insertion loss spectrum that attenuates stimulated Raman scattered light generated in said optical output waveguide but allows the first pumping light or the light to be amplified to transmit therethrough.

2. A light source apparatus according to claim 1, wherein said optical multiplexer includes a fused fiber optical coupler.

3. A light source apparatus according to claim 1, wherein said optical component includes a fused fiber optical coupler provided on the propagation path of the light to be amplified.

4. A light source apparatus according to claim 1, wherein ions making an optical amplifier effect in said optical amplifier waveguide include Yb ions.

5. A light source apparatus according to claim 1, wherein, when a gain to Raman scattered light during one-round passage between said pumping light source and said optical output waveguide is set to G (dB), a loss in Raman scattered light during one-round passage between said pumping light source and said optical output waveguide is set to L (dB), a reflectance ratio of stimulated Raman scattered light of said pumping light source is set to $R_1$ (dB), an apparent reflectance ratio of stimulated Raman scattered light viewed at an input end of said optical output waveguide is set to $R_2$ (dB), a product of power (kW) of the light to be amplified that is inputted into said optical output waveguide and a length (m) of said optical output waveguide is set to Q, and coefficients obtained at the time of executing collinear approximation of a relationship of the apparent reflectance ratio with a product of laser light power and the length of said optical output waveguide are $K_1$ and $K_2$, said optical component has a loss X (dB), in a Raman scattered light wavelength, which satisfies the following conditions:

$X > G-L+R_1+R_2$; and $R_2 = K_1 \cdot Q - K_2$.

* * * * *